United States Patent [19]

Schneider

[11] 4,114,966
[45] Sep. 19, 1978

[54] BATHROOM CABINET

[76] Inventor: Walter Schneider, 54 Wildenbühlstrasse, Langnau am Albis, Switzerland

[21] Appl. No.: 761,820

[22] Filed: Jan. 24, 1977

[30] Foreign Application Priority Data

Jan. 31, 1976 [CH] Switzerland ............ 1207/76

[51] Int. Cl.² ............ A47B 67/02; F16B 12/00
[52] U.S. Cl. ............ 312/245; 312/140
[58] Field of Search ............ 312/245, 140

[56]  References Cited

U.S. PATENT DOCUMENTS

| 1,625,011 | 4/1927 | Wolfe et al. | 312/245 |
| 1,781,408 | 11/1930 | Morris et al. | 312/140 |
| 1,790,977 | 2/1931 | Boer | 312/245 |
| 2,733,887 | 2/1956 | Schmidt | 312/245 |
| 2,800,380 | 7/1957 | Baker | 312/245 |
| 3,071,288 | 1/1963 | Gantner | 312/245 |
| 3,497,281 | 2/1970 | Wilde | 312/245 |
| 3,623,435 | 11/1971 | Ferndinand et al. | 312/140 |
| 3,765,740 | 10/1973 | Mastrangelo | 312/140 |

FOREIGN PATENT DOCUMENTS

| 2,313,342 | 9/1974 | Fed. Rep. of Germany | 312/140 |
| 171,574 | 12/1934 | Switzerland | 312/140 |
| 1,168,595 | 10/1969 | United Kingdom | 312/140 |
| 872,061 | 7/1961 | United Kingdom | 312/245 |
| 336,685 | 10/1930 | United Kingdom | 312/140 |

Primary Examiner—Kenneth Downey
Assistant Examiner—Victor N. Sakran
Attorney, Agent, or Firm—William Anthony Drucker

[57]  ABSTRACT

Container for use as a cabinet, in particular as a bathroom cabinet, shelf and similar, with a back wall and side walls having U-section covering panels, in which the back wall of the container is formed by a framework of U-section bars provided with at least one back wall panel, the sides of these bars protruding at right angles from the back wall, with the profiled frame bars being held together by fixed corner angle pieces slipped in between the sides mentioned and positively connected with these, these corner angle pieces projecting — in the wall planes, beyond the profiled frame bars, with U-section wall covering panels being positively attached onto the sides of these corner angle pieces.

12 Claims, 7 Drawing Figures

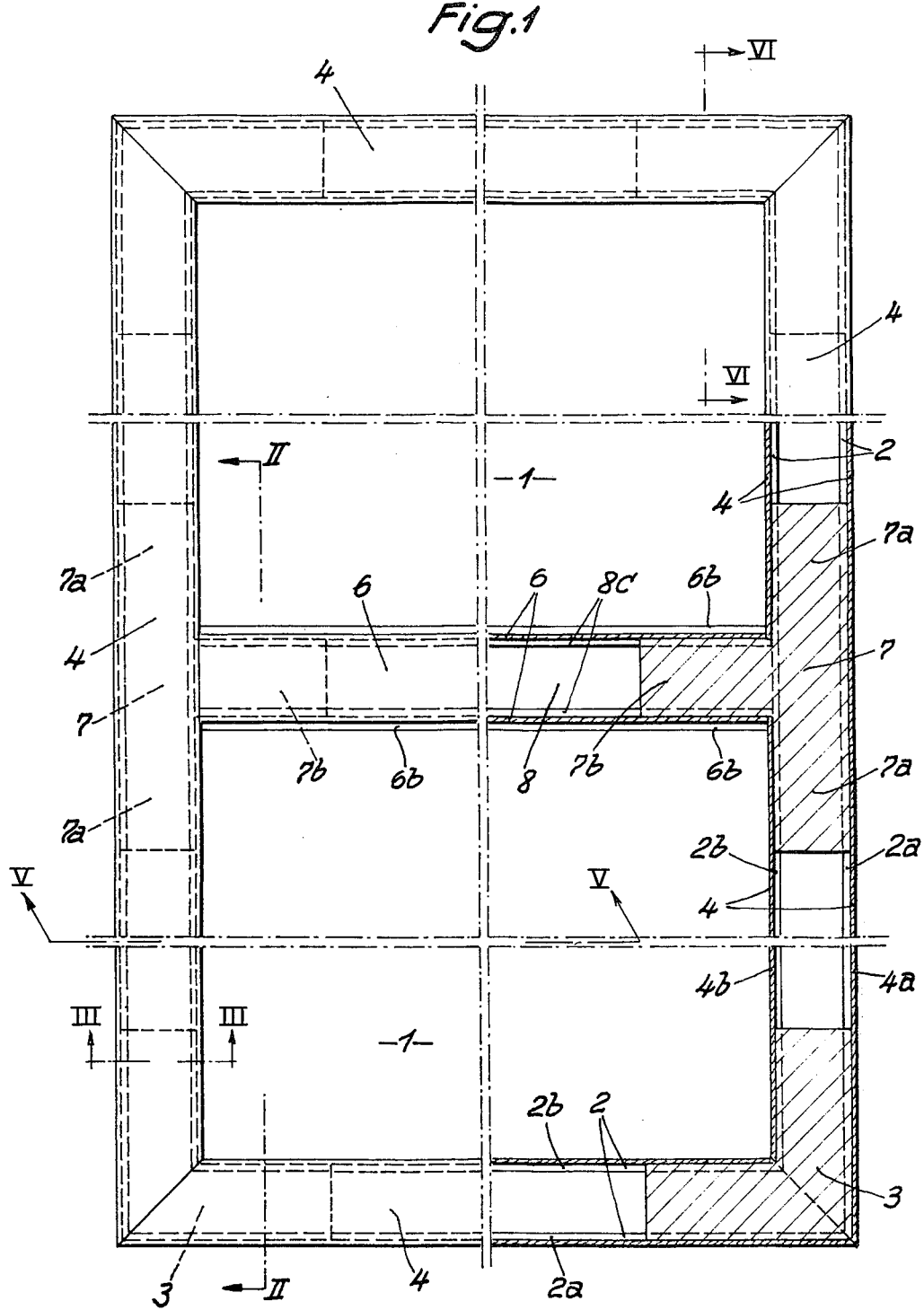

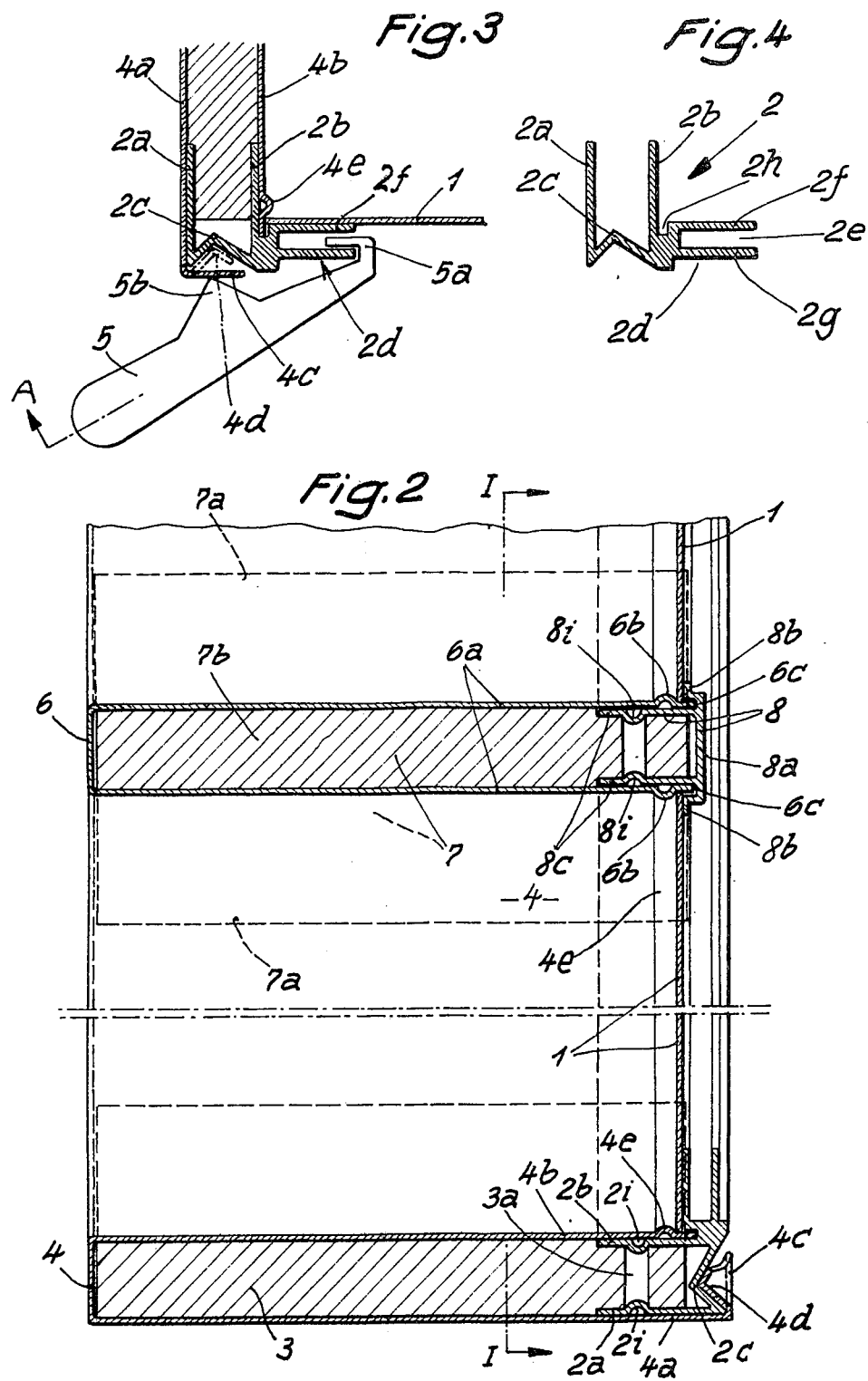

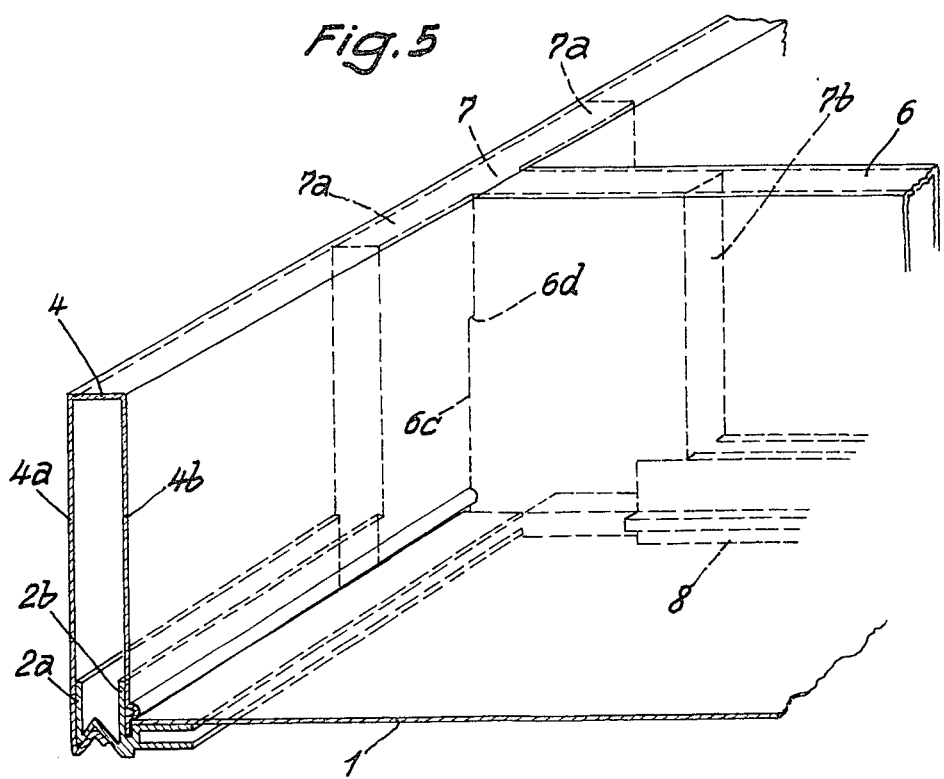
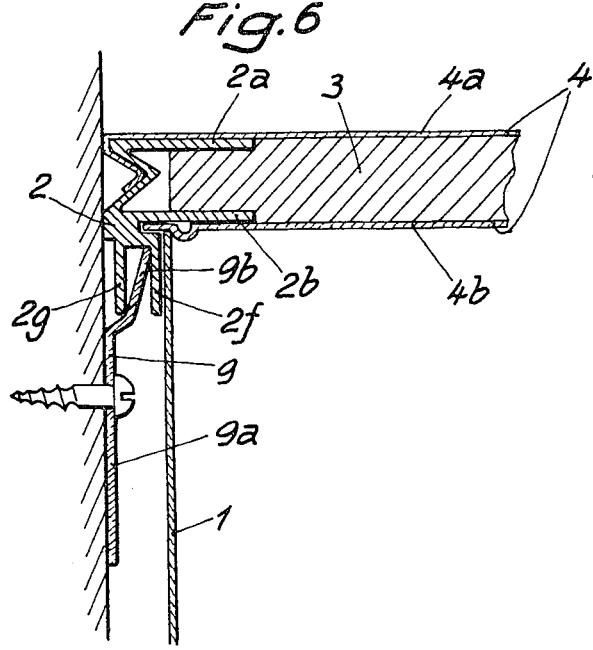
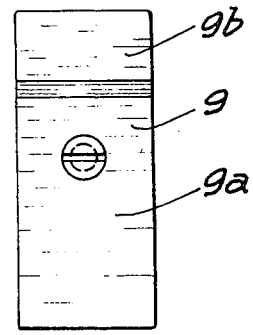

BATHROOM CABINET

BACKGROUND OF THE INVENTION

1. Field of the Invention

This invention relates to a container for use as a cabinet, in particular as a bathroom cabinet, shelf and similar, with a back wall and side walls being provided with U-section covering panels.

2. Description of the Prior Art

This type of container is known, with the U-section covering panels being mounted onto the walls of a hard foamed-plastic body formed as one piece with the back wall.

However, this type of one-piece foamed-plastic body is relatively expensive and requires a lot of space when stored and during transport.

SUMMARY OF THE INVENTION

The container of the invention aims at eliminating these disadvantages. In the present invention the back wall of the container is formed by a framework of U-section bars provided with at least one back wall panel, the ends of these bars projecting at right angles from the back wall, with the U-section bars which form the frame being held together by fixed corner angle pieces inserted between and positively connected with the mentioned bar ends, these angle pieces protruding beyond the frame bars, and the U-section wall covering panels being positively mounted on the sides protruding beyond the profiled bars.

In spite of large material and weight savings, the containers as per the present invention proved to be extremely inherently stable, and they can be manufactured at very reasonable prices. The fact that the containers can be assembled quickly and effortlessly at their place of use without any works assembly is of particular advantage, with transport becoming cheaper and storage being made considerably easier.

It is also possible to provide the container as per the present invention with shelves or partition walls, each being formed by a U-shaped covering profile which is slipped onto the cross-pieces of two T-section pieces positioned opposite each other, the sides of the T-section pieces being positively held between the mentioned sides of two profiled frame bars positioned opposite each other.

BRIEF DESCRIPTION OF THE DRAWINGS

FIG. 1 represents a front elevation with partial vertical section through the container, parallel to the back wall plane, as per line I—I in FIG. 2;

FIG. 2 represents a vertical part-section, at right angles in relation to the back wall plane, as per line II—II in FIG. 1;

FIG. 3 shows a section taken on the line III—III in FIG. 1;

FIG. 4 represents a cross-section of a profiled frame bar;

FIG. 5 represents a perspective partial view of the container taken on the line V—V in FIG. 1;

FIG. 6 shows a section taken on the line VI—VI in FIG. 1; and FIG. 7 shows a front view of a support bracket for hanging the container on the wall.

DESCRIPTION OF THE PREFERRED EMBODIMENT

The illustrated container has a back wall frame consisting of U-section bars 2 provided with back wall panels 1. It can be seen that the sides 2a, 2b, of the profiled frame bars are positioned at right angles to the back wall plane and thus form part of the side walls of the container. The cross-piece 2c connecting the two sides 2a, 2b, with each other is not of the normal straight pattern but is shaped with an inflection pointing inwards. For holding the back-wall panels 1, supports are arranged on the frame section 2a–2c, i.e., in form of a U-section rail 2d formed in one piece with the appropriate frame section 2a–2c, the rail opening 2e being turned away from the frame profile 2a–2c and the rail sides 2f, 2g, being at right angles in relation to the sides 2a, 2b, of the appropriate frame section. 2h is a notch recessed between the inner side 2b of the frame section and the molded-on U-section rail 2d.

At the intersections, the profiled frame bars 2 are held together by fixed corner angle pieces 3 which are positively inserted between the sides 2a, 2b, and project at right angles from the back wall plane, these angle pieces extending across the complete depth of the container. The positive connection between the corner angle pieces and the sides 2a, 2b, is effected through creases 2i in the area of bores recessed in the corner angle pieces 3. Preferably, the corner angle pieces 3 will consist of a hard foamed plastic such as, e.g., foamed POLYSTYROL.

4 describes U-shaped wall covering panels consisting, e.g., of sheet metal, which are positively slipped onto the corner angle pieces 3. The free end of the outer longer side 4a of these covering sections is provided with an angled section 4c which, as can be seen from FIG. 2, is bent at odd places 4d into the inflection 2c of the appropriate profiled frame bar 2, so that the wall covering sections are safe against a separation from the corner angle pieces 3.

To produce these inflections 4d, a tool as shown in FIG. 3 may be used. This tool consists of a lever 5 which, at one end, extends into a hook 5a and is provided with a cam 5b adapted to the inflection of the cross-piece 2c of the frame section 2. In order to bend the angle section 4c of the side 4a of the covering section 4, the hook 5a of lever 5 is introduced in between the sides of the U-section rail 2d, with the lever 5 subsequently being moved in the direction of arrow A.

The free end of the inner side 4b of the wall covering sections protrudes into the notch 2h of the appropriate profiled frame bar and is to be provided with a crease 4e projecting outwards and arranged at a distance from the side ends and parallel to these, with the back-wall panels 1 being held between the crease 4e and side 2f of the U-section rail 2d.

As can be seen from FIGS. 1 and 2, the container has been provided with a shelf. Like the side walls of the container, this consists of a U-shaped covering section 6. As a support for this shelf, two T-section pieces 7 are used whose sides 7a are inserted in between the sides 2a and 2b of two profiled frame bars 2 positioned opposite each other, and are positively connected with these, e.g., by means of punched impressions, as shown in FIG. 2. For a reinforcement of the shelf covering section, a U-section fillet 8 is slipped — from the back-wall side of the container — onto the cross-piece 7b of the T-section pieces 7. The cross-piece 8a of this U-section fillet extends into two Z-profiles 8b which serve as supports for the back wall panels 1 and which, together with the sides 8c of the U-section fillet 8, each limit a notch into which the free ends of sides 6a of the covering section 6 engage. This shelf covering profile, too, is provided with creases 6b protruding outwards and being arranged at a distance from the free ends of sides 6a, with the back-wall panels 1 being held in between these creases and the Z-profiles 8b.

When assembling the container, it is advantageous to first join the profiled frame bars 2, using the corner angle pieces 3, to form a rigid frame, with sides 7a of the T-section pieces 7 being subsequently positively inserted into two profiled frame bars positioned opposite each other. This is followed by the U-section fillet 8 being slipped onto the cross-pieces 7b of the T-section pieces 7 from the back-wall side of the container, with the back-wall panels 1 being subsequently attached, and by the shelf-covering profile 6 being slipped — from the container front — onto the cross-pieces 7b of the two T-section pieces 7, and the wall covering profiles 4 being subsequently slipped onto the corner angle pieces 3.

The fronts 6c of the shelf covering profile may either join flush onto the wall covering profiles 4 or their inner sides 4b respectively, or they may — in their upper part at 6d — be set back by the plate thickness of the adjoining wall covering section 4, in which case the sides 4b of the wall covering section have to be cut out to accept the protruding front parts of the shelf covering profile 6, so that the latter is secured in its position.

Container partition walls can be added in a similar manner as the shelf described.

For hanging the container on a wall, the simple device shown in FIG. 6 may be used; it consists of two plate brackets 9 with a lower flat part 9a designed for screwing onto the wall, and an upper angled part 9b. The container is attached to the plate brackets in such a way that the angles 9b grip in between the sides 2f, 2g, of the U-section rail 2d of the upper profiled frame bar 2.

It is furthermore possible to provide the cavities of the covering profiles 4 and 6 — as far as these are not filled by the corner angle pieces 3 and the T-section pieces 7 — with sound-absorbing inserts such as, e.g., soft foam material panels which, like the corner angle pieces 3 and the T-section pieces 7, are held between the sides 2a, 2b of the profiled frame bars 2 and the sides 8c of the U-section fillet 8. These are to prevent noise-producing vibrations of the covering profiles which may, e.g., consist of sheet metal.

I claim:

1. A container for use as a cabinet, in particular as a bathroom cabinet, comprising:
   (a) a framework;
   (b) a back wall in the form of at least one plate supported by the framework; and
   (c) side walls supported by the framework, wherein the framework is formed by a plurality of U-section bars, each having sides projecting at right angles to the back wall, and a plurality of corner angle pieces formed of hard foamed plastic slipped in between said sides of said U-section bars and positively connected thereto, said corner angle pieces having bores extending beyond said U-section bars and said side walls being in the form of U-section covering panels fitted over said corner angle pieces, the positive connection between the corner angle pieces and the sides being effected through creases in the area of said bores recessed in the corner angle pieces.

2. Container according to claim 1, having supports holding said back wall onto said U-section bars.

3. Container according to claim 2, wherein said support comprise a U-section rail formed integrally with each U-section bar, each said U-section rail having an opening turned away from said U-section bar, and sides positioned at right angles to said sides of said U-section bar.

4. Container according to claim 1, in which said sides of each U-section bar are joined by a cross-piece having a bend pointing inwards.

5. Container according to claim 1, in which said U-section covering panels have shorter side facing towards the interior of the container and a longer side facing towards the exterior of the container, said longer side having an end portion which is bent around said U-section bar and said shorter side having a crease positioned close to and parallel to its free end projecting towards the interior of the container to support said back wall.

6. Container according to claim 5, in which said end portion of said longer side is bent at least in parts into said bend of said cross-piece of said U-section bar.

7. Container according to claim 6, in which a notch is formed between that side of said U-section bar which faces towards the interior of the container and said U-section rail, and said free end of said shorter side is engaged in said notch.

8. Container according to claim 1, wherein the framework further includes two T-section pieces positioned on opposite sides of said framework, each T-section piece having two cross arms slipped in between the sides of two adjacent ones of said U-section bars, a dividing member selected from the group consisting of a shelf and a partition wall, said dividing member being formed by a U-section panel slipped onto the remaining arm of each said two T-section pieces.

9. Container according to claim 8, in which a U-section fillet is attached to each of said T-section pieces and said dividing member has two sides, the free ends of which abut against said U-section fillet.

10. Container according to claim 9, in which said U-section fillet comprises two sides joined by a cross-piece, said cross-piece extending into Z-profiles which support said back-wall and said Z-profiles together with said sides of said U-section fillet each limiting a notch into which said free ends of said sides of said dividing member engage.

11. Container according to claim 10, in which each of said sides of said dividing member has a crease positioned close to and parallel to its free end and projecting away from said T-section piece.

12. Container according to claim 1, in which the cavities of said U-section panels are provided with sound-absorbing inserts which are held between said sides of said U-section bars and between said sides of said U-section fillet.

* * * * *